United States Patent [19]
Groenenboom

[11] Patent Number: 6,140,962
[45] Date of Patent: Oct. 31, 2000

[54] ANTENNA SYSTEM

[75] Inventor: Albert Groenenboom, Hengelo, Netherlands

[73] Assignee: Hollandse Signaalapparaten B.V., Hengelo, Netherlands

[21] Appl. No.: 09/300,455

[22] Filed: Apr. 28, 1999

[30]     Foreign Application Priority Data

Apr. 29, 1998 [NL] Netherlands .......................... 1009033

[51] Int. Cl.⁷ ................................................. H01Q 3/22
[52] U.S. Cl. ........................................ 342/375; 342/372
[58] Field of Search ................................. 342/368, 372, 342/374, 375

[56]                References Cited

U.S. PATENT DOCUMENTS

| | | | |
|---|---|---|---|
| 4,028,702 | 6/1977 | Levine | 343/100 SA |
| 4,234,940 | 11/1980 | Iinuma | 367/105 |
| 4,757,318 | 7/1988 | Pulsifer et al. | 342/375 |
| 5,103,233 | 4/1992 | Gallagher et al. | |
| 5,140,333 | 8/1992 | Parker | 342/371 |
| 5,353,033 | 10/1994 | Newberg et al. | 342/375 |
| 5,414,433 | 5/1995 | Chang | 342/375 |
| 5,731,784 | 3/1998 | Barron et al. | |

FOREIGN PATENT DOCUMENTS

| | | |
|---|---|---|
| 0 614 092 A1 | 9/1974 | European Pat. Off. . |
| 0 440 200 A2 | 8/1991 | European Pat. Off. . |
| 0 520 489 A2 | 12/1992 | European Pat. Off. . |

*Primary Examiner*—Thomas H. Tarcza
*Assistant Examiner*—Dao L. Phan
*Attorney, Agent, or Firm*—Oblon, Spivak, McClelland, Maier & Neustadt, P.C.

[57]            ABSTRACT

A multiface phased array antenna, with each antenna face being provided with a plurality of T/R modules. To preclude the occurrence of crosstalk among the different antenna faces, caused by the steep edges of transmitted RF pulses, these pulses are delayed per T/R module with a delay selected from a predetermined time interval.

5 Claims, 2 Drawing Sheets

ANTENNA SYSTEM

BACKGROUND OF THE INVENTION

1. Field of the Invention

The invention relates to a phased array antenna system for radar applications, including at least two phased array antenna faces suitable for producing RF transmitter pulses, each antenna face provided with an RF amplifier for producing RF pulses of an at least substantially constant amplitude, a supply network for providing the T/R modules with an RF input signal and a control unit for generating control signals for the individual T/R modules.

2. Discussion of the Background

Antenna systems of this type are known under the name of multiface phased array antenna system and are used, for instance, on board naval ships for a considerable number of tasks which until recently required the availability of a variety of fire-control and surveillance radar systems. Besides, these systems are of a sturdy construction which ensures their sustained operation also in the event of a failure of part of the T/R modules.

The common assumption with multiface phased array antenna systems is that the various faces are capable of operating independently. A more specific assumption is that transmission of RF pulses by one antenna face and reception by another face may coincide, or worded differently, that the isolation between the various faces is satisfactory. To this end, the phased array antenna system is designed on the basis of a predetermined isolation between adjacent antenna faces. This isolation is however only realized by stipulating a predetermined frequency difference for the transmissions of adjacent antenna faces. This frequency difference can be easily determined on the basis of the required isolation and maximum power, the bandwidth and the spectral purity of the RF transmitter pulses.

When employing active T/R modules, crosstalk from a transmitting face to a receiving face is still found to occur during a leading or trailing edge of an RF transmitter pulse. A solution well-known in the art to crosstalk problems of this type is by providing the RF transmitter pulse with a tapering. In the event of a given frequency difference between the transmitting face and the receiving face, the required degree of tapering can, with a view to attaining a specified isolation, be determined in a manner known in itself. For a phased array antenna, this knowledge is insufficient. An RF input signal, provided with a required tapering and subsequently applied to an active T/R module, is found to produce a practically untapered RF transmitter pulse. This is due to the fact that the RF amplifiers in the active T/R modules are driven into saturation in order to realize an acceptable level of efficiency. A good efficiency is required from an economic point of view, but also serves to reduce the load on the already complicated thermoregulation system incorporated in the phased array antenna system.

SUMMARY OF THE INVENTION

The present invention obviates the above-described problem by tapering an RF transmitter pulse produced by an antenna face as a whole and is, according to an aspect of the invention, characterized in that the control unit generates one gate pulse for activating all RF amplifiers of an antenna face and that each T/R module is provided with delay means for delaying the gate pulse with a delay selected for that module in order to minimize the occurrence of crosstalk to another antenna face.

A phased array antenna in which the modules are activated at different points of time is known from EP 0.520.489 B1. The antenna described therein is however a single-face phased array which, in order to enable single pulse Doppler processing, radiates pulses which are required to have a predetermined shaping throughout the continuance of the pulse to ensure a good Doppler resolution of targets.

An advantageous embodiment according to a further aspect of the invention is characterized in that the delay is selected from a predetermined time interval, which in fact determines the length of the tapering and, consequently, also the width of the spectrum generated during tapering.

A highly advantageous embodiment according to a further aspect of the invention is characterized in that the delays are selected such that the number of active modules as a function of time realizes the required rise time and fall time of the RF transmitter pulses.

In an active phased array antenna system, a uniform antenna weighting function is always applied, at least during transmission. This is necessary because the RF amplifiers in the T/R modules have to be driven into saturation. A further aspect of the invention therefore relates to the distribution, during the rise and fall time of the RF transmitter pulses, of recently activated or still activated T/R modules over the surface of an antenna face. This distribution determines the beam shape and consequently the side-lobe behaviour as well as the isolation with respect to an adjacent receiving antenna face during the rise and fall time.

An advantageous embodiment according to a further aspect of the invention is characterized in that modules subject to a certain delay are disposed on the surface of an antenna face such that, during the rise and fall time of the RF transmitter pulses, the antenna weighting function continuously approximates an at least substantially uniform tapering. This can be simply realized by designating the active modules substantially pseudo-randomly.

For phased array antenna systems incorporating a relatively limited number of T/R modules, the isolation can be further enhanced according to another aspect of the invention which is thereto characterized in that the delay means are arranged for the intermittent activation of a T/R module at the rise of an RF transmitter pulse and for the intermittent deactivation of a T/R module prior to the expiration of an RF transmitter pulse. By thus smoothing the distribution of RF power over the antenna surface during the RF transmitter pulse rise and fall time, a larger number of T/R modules are simulated, resulting in a reduction of the antenna side lobes. The delay means are designed for keeping activated, at any given moment, a number of T/R modules to be employed at that particular moment and for continuously striving to attain a uniform distribution of activated T/R modules over the antenna surface.

Generally, a rise and fall time of less than one microsecond will suffice for a phased array antenna system. In that time frame a plurality of T/R modules have to be activated. Nevertheless, the object aimed at is to activate or deactivate only one module at a time in order to ensure continuous low side lobes.

According to a further aspect of the invention, the phased array antenna system is therefore characterized in that the delay means are arranged to spread the moments on which the T/R modules are activated and subsequently deactivated.

A highly advantageous embodiment is thereto characterized in that the delay means incorporate both digital and analog delay means. A digital signal derived from the gate pulse determines the moment of T/R module activation or deactivation, although the T/R module additionally comprises an analog short-duration delay circuit which, on the basis of selected analog values or permissible spread in analog values, produces a clock signal-independent delay.

BRIEF DESCRIPTION OF THE DRAWINGS

The invention will now be described in further detail with reference to the following figures, of which.

DETAILED DESCRIPTION OF THE PREFERRED EMBODIMENT

Figure 1:
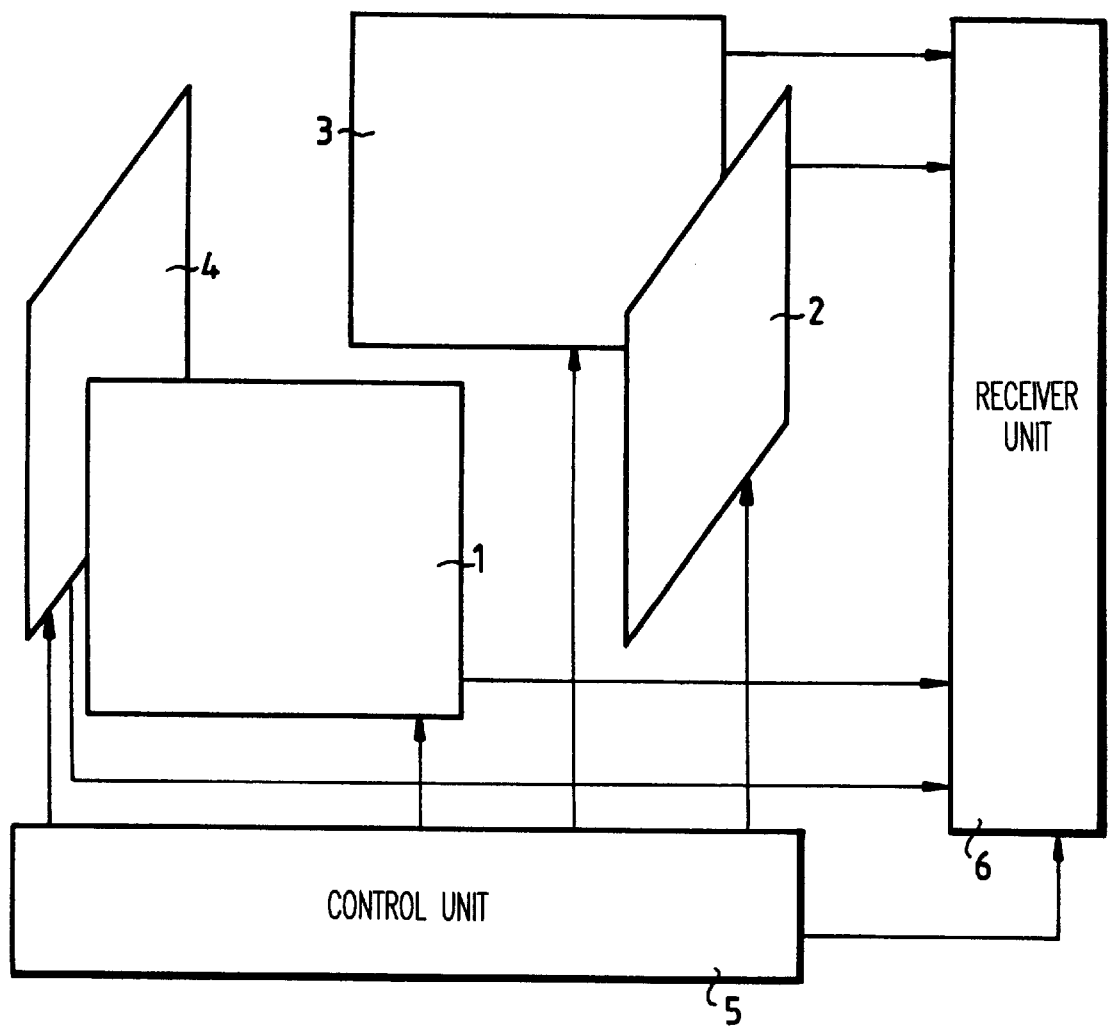
FIG. 1 schematically represents a four-face phased antenna system.

FIG. 1 is a schematic representation of a phased array radar system comprising four antenna faces 1,2,3,4 which are suitable for shipboard applications and jointly provide a 360-degree azimuthal coverage. Antenna faces 1,2,3,4 receive RF input signals and timing signals from a control unit 5 and pass the echo signals received per antenna face to a receiver unit 6 for further processing. Antenna faces 1,2,3,4 are active, which means that the antenna faces are realized by an array of active T/R (transmit/receive) modules, each of which is provided with an RF power amplifier for the transmit function, an LNA (low noise amplifier) and at least one adjustable phase shifter.

Figure 2:
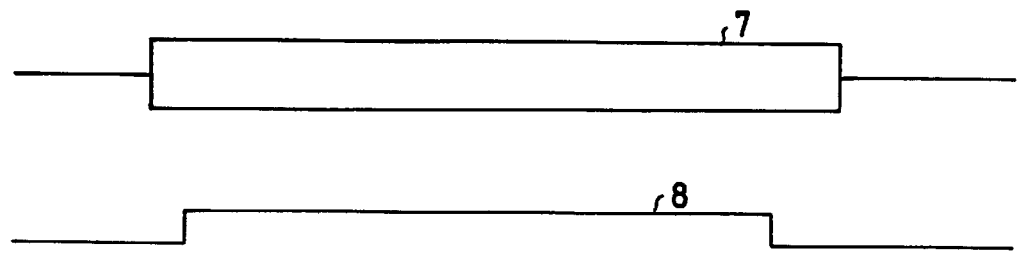
FIG. 2 schematically represents an RF input signal and an associated gate pulse.

FIG. 2 is a schematic representation of an RF input signal 7 for a T/R module and an associated gate pulse 8. Gate pulse 8 originally served as a protection for T/R modules against uncontrolled activation of the RF amplifier for the transmit function. In this original function, gate pulse 8 is wider than RF input signal 7. The consequent advantage is that the RF input signal can be provided with a tapering. Since the tapering does not serve any useful purpose when employing an RF amplifier driven into saturation, gate pulse 8 is now chosen such that it is completely within RF input signal 7. Gate pulse 8 consequently determines the starting point and the length of the RF pulses to be delivered.

Figure 3:
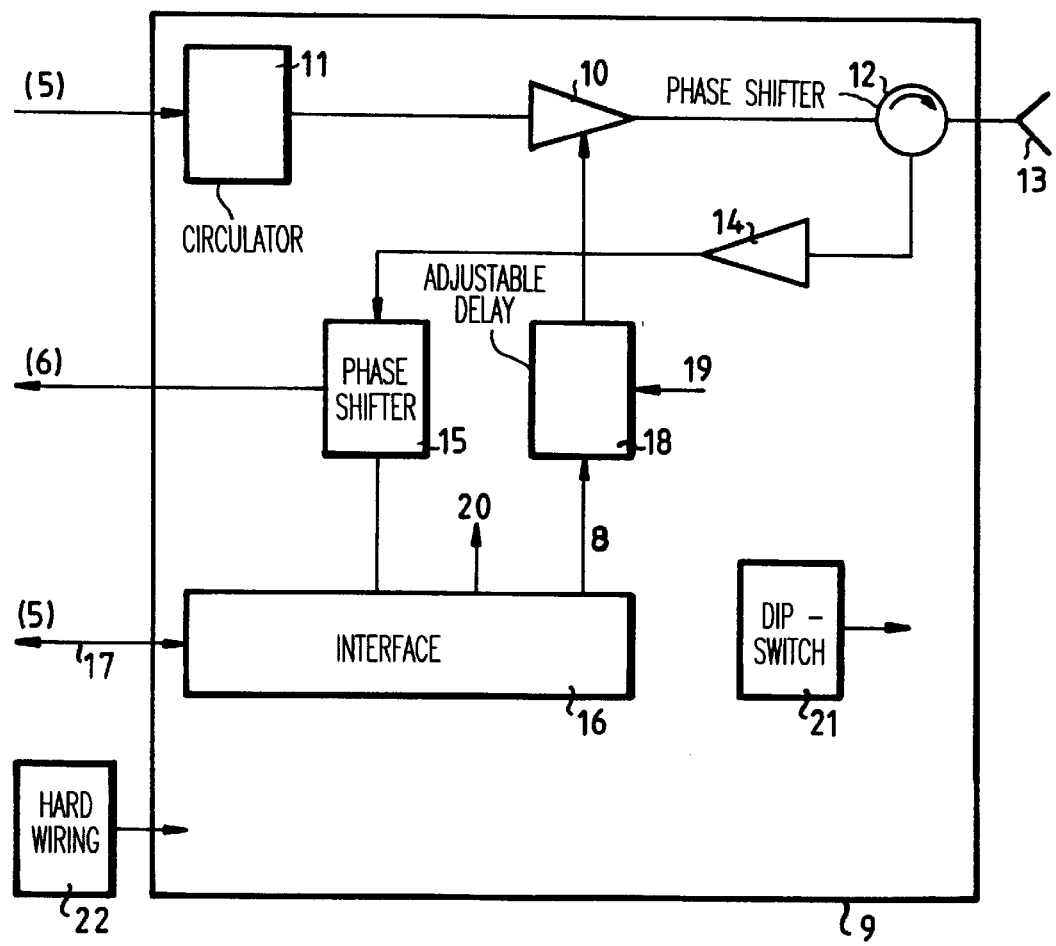
FIG. 3 schematically represents a feasible embodiment of a T/R module incorporating a delay circuit.

FIG. 3 is a schematic representation of a feasible embodiment of a T/R module 9 incorporating an RF amplifier 10 which, via a transmit phase shifter 11, receives an RF input signal from control unit 5 and which supplies its RF output signal to a radiator 13 via a circulator 12. T/R module 9 additionally comprises an LNA 14 which is connected to radiator 13 via circulator 12 and which supplies its output signal to receiver unit 6 via a receive phase shifter 15. T/R module 9 also comprises a digital interface 16 which receives its commands from control unit 5 via a digital connection 17. Interface 16 supplies a gate pulse 8, relevant to the present invention, which activates and deactivates RF amplifier 10. According to the invention, gate pulse 8 is chosen such that it effectively determines the RF pulse shape. Via adjustable delay 18, the delay of which can be adjusted via an input 19, gate pulse 8 is applied to RF amplifier 10. Adjustable delay 18 is a digital circuit in which a value applied to input 19 is loaded, the contents of which are used in a manner known in the art to realize the set delay. By applying different values for different T/R modules to input 19, it can be effected that the RF pulses of the different T/R modules no longer exactly overlap, which consequently results in a tapering of the RF transmitter pulses. In this process, the mutual coherence remains ensured as it is based on the same RF input signal and because each amplifier 10 is always in a well-defined state.

Input 19 may be controlled in various ways, for instance, as output signal 20 of interface 16 during an initialization phase of the antenna system or per scheduled transmission. An additional possibility is to set the control for each T/R module via a dipswitch 21 or hard wiring 22.

For an antenna system incorporating for instance 5000 T/R modules, a defined tapering of the transmitter pulse of 1 $\mu$sec. can be obtained by realizing adjustable delay 18 as a 10-bit counter that is clocked down to zero at a clock frequency of 1 Ghz. This causes a number of T/R modules to be activated or deactivated every nanosecond. The effect of discrete, simultaneous switching, which in itself is undesirable, can be reduced by guiding the switching signal via an analog delay with a statistical spread in the subnanosecond range, for instance an RC circuit with some tolerance.

Besides the number of T/R modules, required to be activated at any given moment, the exact position on the antenna face of a T/R module to be activated is also of importance. An arbitrary activation of the T/R modules may cause high side lobes, as a result of which the specified isolation might not be attained. As the specified isolation is based on a uniform antenna weighting function, it will during the rise and fall time suffice to also aim for a uniform weighting function in case a thinned array well-known in the art is involved. This will result in side lobes that are substantially constant and which, as regards the location, are substantially equal to the side lobes of the array in the event of all T/R modules being activated.

It is possible to activate modules intermittently, for instance activation after 400 nanoseconds, deactivation after 600 nanoseconds, activation again after 800 nanoseconds. It can simply be demonstrated that, with phased array antennas based on this principle of operation, lower antenna side lobes can be attained during the rise and fall time, which further reduces crosstalk. It will then be necessary to modify delay 18, because in this case not just the delay as such, but a sequence applicable to that T/R module has to be stored. Delay 18 may for instance be realized as a suitably programmed gate array or a programmable logic array.

What is claimed is:

1. A phased array antenna system for radar applications, comprising:

at least two phased array antenna faces configured to produce RF transmitter pulses, each antenna face provided with an array of active T/R modules, and each T/R module being provided with an RF amplifier for producing RF pulses of an at least substantially constant amplitude;

a supply network configured to provide the T/R modules with an RF input signal; and a control unit configured to generate control signals for individual of the T/R modules, wherein the control unit generates one gate pulse for activating all RF amplifiers of an antenna face, and each T/R module is provided with delay means for delaying the gate pulse with a delay, selected from a predetermined time interval such that in response to a leading edge of the gate pulse a number of active of the T/R modules gradually increases and in response to a trailing edge of the gate pulse the number of active of the T/R modules gradually decreases, for providing produced RF transmitter pulses with selected rise and fall times for minimizing occurrence of crosstalk to another antenna face.

2. A phased array antenna system as claimed in claim 1, wherein the time interval is selected in relation to a frequency separation between transmissions of adjacent antenna faces.

3. A phased array antenna as claimed in claim 1, wherein the T/R modules of at least one antenna face are provided with the delay means to introduce substantially equal delays and are disposed on the surface of an antenna face such that, during the rise and fall time of the RF transmitter pulses, an antenna weighting function continuously approximates an at least substantially uniform tapering.

4. A phased array antenna as claimed in claim 2, wherein the T/R modules of at least one antenna face are provided with the delay means to introduce substantially equal delays and are disposed on the surface of an antenna face such that, during the rise and fall time of the RF transmitter pulses, an antenna weighting function continuously approximates an at least substantially uniform tapering.

5. A phased array antenna system as claimed in claim 1, wherein the delay means are arranged for intermittent activation of the T/R modules at a rise of an RF transmitter pulse and for intermittent deactivation of the T/R modules prior to an expiration of an RF transmitter pulse.

* * * * *

UNITED STATES PATENT AND TRADEMARK OFFICE
CERTIFICATE OF CORRECTION

PATENT NO. : 6,140,962

DATED : OCTOBER 31, 2000

INVENTOR(S): ALBERT GROENENBOOM

It is certified that an error appears in the above-identified patent and that said Letters Patent is hereby corrected as shown below:

In Figure 3, reference no. 11, change "CIRCULATOR" to --PHASE SHIFTER--;
reference no. 12, change "PHASE SHIFTER" to --CIRCULATOR--.

Signed and Sealed this

Twenty-ninth Day of May, 2001

Attest:

NICHOLAS P. GODICI

Attesting Officer  Acting Director of the United States Patent and Trademark Office